Patented Oct. 27, 1953

2,657,162

UNITED STATES PATENT OFFICE 2,657,162

PRODUCTION OF BONDED RUBBER ARTICLES

Frederick Joseph Tibenham, Castle Bromwich, England, assignor to Dunlop Rubber Company Limited, London, England, a British company No Drawing. Application January 30, 1952, Serial No. 269,128. In Great Britain March 4, 1950

8 Claims. (Cl. 154—139)

This invention relates to the production of bonded rubber articles.

It is known to use a mixture of polyvinyl acetal and a heat-hardening aldehyde resin for bonding two components of a composite article together; the surfaces to be bonded are coated with the mixture and the coated surfaces are then brought together and the assembly heated while the surfaces are pressed against each other, thereby effecting hardening of the resin and formation of the bond. This method has been used for example for bonding together rigid components of wood, metal and synthetic resins. The method is, however, not satisfactory for bonding rigid components of these materials to soft vulcanised rubber, for failure of the bond occurs at the interface of the rubber and the adhesive material when the bond is subjected to only a very low shearing force.

According to the present invention a process for making composite articles comprises subjecting the surface of a soft-vulcanised rubber component to chemical modification by cyclisation or halogenation, bringing said modified surface into juxtaposition with a rigid component with a bonding layer therebetween comprising a polyvinyl acetal and a hardenable aldehyde resin, and hardening the resin while pressing the rubber against the rigid component.

By means of this invention soft-vulcanised rubber can be bonded to metals, e. g. steel and aluminium, to wood, and to synthetic resin components particularly acrylic resins, e. g. polyacrylates and polymethacrylates. In the case of the acrylic resins bonds may be produced having a shear strength greater than 300 lbs./square inch, and in many cases the bond strength is greater than the strength of the resins, so that if the bonds are subjected to shear, failure occurs in the resin. If acrylic resin is bonded to soft-vulcanised rubber which has not been given a pretreatment in accordance with the invention the bond strengths which result may be as low as 45 lbs./sq. inch.

The chemical modification to which the soft-vulcanised rubber is subjected is a halogenation treatment or a cyclisation treatment. Thus for example the surface of the rubber may be treated with a solution of bromine or chlorine in water or in carbon tetrachloride whereby halogenation is effected, or the surface may be treated with concentrated sulphuric acid or other cyclising agent to effect cyclisation of the rubber in the surface layer. These treaments reduce the degree of unsaturation of the rubber in the surface layer and produce a superficial hardening. Care must be taken that the cyclisation or halogenation is not carried out for an overlong period as the rubber may then crack. For example, a suitable time for effecting cyclisation with concentrated sulphuric acid in the cold is 1 to 5 minutes; for effecting halogenation with chlorine water in the cold a suitable time is 12 to 24 hours.

Preferably the bonding layer comprises a polyvinyl acetal, e. g. polyvinyl butyral, mixed with a phenol-formaldehyde resin which is capable of setting under the influence of heat alone, or the polyvinyl acetal may be mixed with a phenol-formaldehyde resin of the Novolak type which hardens on heating with a methylene donor, e. g. paraformaldehyde or hexamethylene-tetramine, the requisite amount of the methylene donor being then mixed with the resin and the acetal. A catalyst for hardening the resin may also be included in the mixture. Preferably the bonding material contains 80 parts to 140 parts by weight of the resin for every 100 parts by weight of the acetal. The bonding material may be applied to the surfaces to be bonded as a solution or suspension of the resin and the acetal, together with the catalyst or methylene donor, if such is used, in a volatile liquid, e. g. methylated spirit, acetone, monochlorbenzene or toluene or a mixture of such liquids, and then while the coating is still tacky due to the presence of the solvent the surfaces to be bonded are pressed into contact. The solution or suspension may contain 15% to 50% by weight of the bonding material.

Hardening of the resin may be effected at room temperature, a week or more being usually necessary to form the bond, but preferably the assembly is heated, e. g. to a temperature of 45° C. to 75° C. to bring about hardening of the resin, in which case a shorter time, e. g. 1 to 3 days, suffices to form the bond.

The following examples illustrate the invention, all parts being by weight.

Example 1

A strip of soft-vulcanised rubber was immersed in cold concentrated sulphuric acid for 5 minutes and was then washed in water and dried. The two faces of the treated strip and one surface of each of two sheets of the polyacrylic resin sold under the registered trademark "Perspex" were then coated with the following composition:

| | Parts |
|---|---|
| Polyvinyl butyral | 9.9 |
| Heat-hardenable phenol-formaldehyde resin (sold by British Resin Products as J. 1990 resin) | 10.5 |
| Methylated spirit | 79.6 |

While the coatings were still tacky the rubber and the resin sheets were assembled with the rubber strip between the two resin sheets, the coated surfaces being in contact. The assembly was held together under slight pressure in a clamp and kept at 50° C. for 3 days. Bonding of the rubber to the resin sheets was thus effected.

A number of rubber-Perspex units were made in this way, and the shear strengths of the bonds of six of them were tested. The mean shear strength was 728 lbs. per square inch. Three of the six units tested failed in the resin sheet.

A number of soft-vulcanised rubber-Perspex units were made in a similar way without pretreatment of the rubber surface, bonding being effected by heating at 70° C. for 3 days. The strengths of the bonds of six of them were tested, and the mean found to be 45 lbs./sq. inch.

Example 2

A strip of soft-vulcanized rubber was immersed for 16 hours in a cold saturated solution of chlorine in water, and the rubber was then washed and dried. The treated rubber strip was then bonded to two sheets of "Perspex" as described in Example 1.

The shear strength of the bond between the rubber and the sheets was found to be 338 lbs. per square inch.

Example 3

A strip of soft-vulcanised rubber was immersed in cold concentrated sulphuric acid for 5 minutes, washed and dried. The two faces of the treated strip and one surface of each of two sheets of "Perspex" were then coated with the following composition:

| | Parts |
|---|---|
| Polyvinyl butyral | 7.82 |
| "Bakelite" resin R. 10840 (a Novolak type phenol-formaldehyde resin) | 8.33 |
| Hexamethylene tetramine | 0.83 |
| Methylated spirit | 83 |

While the coatings were still tacky the rubber and the resin sheets were assembled with the rubber strip between the two resin sheets, the coated surfaces being in contact. The assembly was held together under slight pressure in a clamp and kept at 50° C. for 3 days. Bonding of the rubber to the resin sheets was thus effected.

Six units were made in this way and the shear strengths of the bonds of each were tested. The mean shear strength was 494 lbs. per square inch and in three of the tests failure occurred in the resin sheet.

Example 4

A strip of soft-vulcanised rubber was immersed in cold concentrated sulphuric acid for 5 minutes, washed and dried. The strip was then bonded to two sheets of "Perspex" by the method of Example 3 but using as the bonding material the following composition:

| | Parts |
|---|---|
| Polyvinyl acetal (Alvar 7-70) | 15.6 |
| Heat-hardenable phenol-formaldehyde resin (sold by British Resin Products Ltd., as J. 1990 resin) | 16.6 |
| Methylated spirit | 67.8 |

Six units were made in this way and the shear strengths of the bonds of each were tested. The mean shear strength was 346 lbs. per sq. inch.

Example 5

A strip of soft-vulcanised rubber was immersed in cold concentrated sulphuric acid for 5 minutes, washed and dried. The strip was then bonded to two sheets of "Perspex" by the method of Example 3 using as the bonding material the following composition:

| | Parts |
|---|---|
| Polyvinyl butyral | 9.6 |
| Heat-hardenable phenol-formaldehyde resin sold as "Bakelite" R. 13309 | 10.2 |
| Methylated spirit | 60.7 |
| Toluene | 19.5 |

Six units were so made and the shear strengths of the bond were measured. The mean value of the shear strength was 672 lbs. per square inch. Five of the units failed in the resin sheet.

Example 6

A strip of soft-vulcanised rubber was immersed in cold concentrated sulphuric acid for 5 minutes, washed and dried. The two faces of the treated rubber strip and one surface of each of two strips of steel which had been slightly roughened with emery cloth, were then coated with the following composition:

| | Parts |
|---|---|
| Polyvinyl butyral | 9 |
| Heat-hardenable phenol-formaldehyde resin (sold by British Resin Products Ltd., as J. 1990 resin) | 10 |
| Methylated spirit | 27 |
| Methyl ethyl ketone | 40 |

While the coats were still tacky the rubber and the steel strips were assembled with the rubber strip between the steel strips, the coated surfaces being in contact.

The assembly was held together under slight pressure in a clamp, and allowed to stand at room temperature for 3 hours and was then heated for one hour at 120° C. A number of rubber/steel units were made in this way, and the shear strength of the bonds of six of them was tested. The mean strength was 330 lbs./sq. in.

Having described my invention what I claim is:

1. A process for making composite articles which comprises reducing the unsaturation of the surface of a soft-vulcanized rubber component to form a hardened surface bringing said modified surface into juxtaposition with a rigid component with a bonding layer therebetween comprising a polyvinyl acetal and a hardenable aldehyde resin, and hardening the resin while pressing the rubber against the rigid component.

2. A process according to claim 1 in which the rigid component is made of an acrylic resin composition.

3. A process according to claim 1 in which the unsaturation of the soft-unvulcanized rubber is reduced with sulphuric acid.

4. A process according to claim 1 in which the bonding layer comprises a heat-hardenable phenol-formaldehyde resin.

5. A process according to claim 1 in which the bonding layer comprises 80 to 140 parts by weight of heat-hardenable phenol formaldehyde resin for every 100 parts by weight of polyvinyl acetal.

6. The process of claim 1 in which the unsaturation of the surface is accomplished by subjecting the surface to cyclization of the rubber at said surface.

7. The process of claim 1 in which the reduction in the unsaturation of the surface is accomplished by halogenizing the surface of said soft vulcanized rubber.

8. The process of claim 1 in which the unsaturation of the surface of said rubber is accomplished by chlorinating said surface.

FREDERICK JOSEPH TIBENHAM.

References Cited in the file of this patent

UNITED STATES PATENTS

| Number | Name | Date |
|---|---|---|
| 2,411,878 | Hershberger | Dec. 3, 1946 |
| 2,429,897 | Saunders et al. | Oct. 28, 1947 |